United States Patent
Greszta-Franz et al.

(10) Patent No.: US 9,733,394 B2
(45) Date of Patent: *Aug. 15, 2017

(54) METHOD FOR PREPARING OPTICAL LENSES

(71) Applicant: Covestro Deutschland AG, Leverkusen (DE)

(72) Inventors: Dorota Greszta-Franz, Solingen (DE); Hans-Josef Laas, Odenthal (DE); Hartmut Nefzger, Pulheim (DE); Jens Krause, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/008,524

(22) Filed: Jan. 28, 2016

(65) Prior Publication Data

US 2016/0139301 A1    May 19, 2016

Related U.S. Application Data

(63) Continuation of application No. 14/396,240, filed as application No. PCT/EP2013/058256 on Apr. 22, 2013, now Pat. No. 9,354,355.

(30) Foreign Application Priority Data

Apr. 23, 2012 (EP) .................................. 12165171

(51) Int. Cl.

| | | |
|---|---|---|
| G02B 1/04 | (2006.01) | |
| C08G 18/48 | (2006.01) | |
| C08G 18/50 | (2006.01) | |
| C08G 18/72 | (2006.01) | |
| C08G 18/73 | (2006.01) | |
| C08G 18/75 | (2006.01) | |
| C08G 18/78 | (2006.01) | |
| C08G 18/79 | (2006.01) | |
| C08G 18/42 | (2006.01) | |
| C08L 75/06 | (2006.01) | |
| C08L 75/08 | (2006.01) | |

(52) U.S. Cl.
CPC ........... *G02B 1/041* (2013.01); *C08G 18/425* (2013.01); *C08G 18/4241* (2013.01); *C08G 18/4277* (2013.01); *C08G 18/4286* (2013.01); *C08G 18/48* (2013.01); *C08G 18/4829* (2013.01); *C08G 18/5021* (2013.01); *C08G 18/722* (2013.01); *C08G 18/725* (2013.01); *C08G 18/73* (2013.01); *C08G 18/755* (2013.01); *C08G 18/7831* (2013.01); *C08G 18/7887* (2013.01); *C08G 18/792* (2013.01); *C08L 75/06* (2013.01); *C08L 75/08* (2013.01)

(58) Field of Classification Search
CPC .. C08G 18/792; C08G 18/48; C08G 18/7887; C08G 18/725; C08G 18/4277; C08G 18/425; C08G 18/722; C08G 18/5021; C08G 18/73; C08G 18/4241; C08G 18/4286; C08G 18/4829; C08G 18/755; C08G 18/7831

See application file for complete search history.

(56) References Cited

U.S. PATENT DOCUMENTS

| | | |
|---|---|---|
| 4,218,543 A | 8/1980 | Weber et al. |
| 4,288,586 A | 9/1981 | Bock et al. |
| 4,419,513 A | 12/1983 | Breidenbach et al. |
| 4,454,317 A | 6/1984 | Disteldorf et al. |
| 4,837,359 A | 6/1989 | Woynar et al. |
| 4,960,848 A | 10/1990 | Scholl et al. |
| 4,994,541 A | 2/1991 | Dell et al. |
| 5,076,958 A | 12/1991 | Pedain et al. |
| 5,869,566 A | 2/1999 | Thomas |
| 5,914,383 A | 6/1999 | Richter et al. |
| 6,051,675 A | 4/2000 | Gras |
| 6,107,484 A | 8/2000 | Richter et al. |

(Continued)

FOREIGN PATENT DOCUMENTS

| | | |
|---|---|---|
| CA | 2154107 A1 | 1/1996 |
| DE | 1670666 A1 | 7/1971 |

(Continued)

OTHER PUBLICATIONS

International Search Report for PCT/EP2013/058256 mailed Aug. 9, 2013.
CAPLUS 1980:551381, CAN 93:151381, abstracting DE-290031-A1.
CAPLUS 1978:443514, CAN 89:43514, abstracting DE-2644684-A1.
English translation of International Preliminary Report on Patentability and Written Opinion for PCT/EP2013/058256 mailed Oct. 28, 2014.

*Primary Examiner* — Michael L Leonard
(74) *Attorney, Agent, or Firm* — Drinker Biddle & Reath LLP

(57) ABSTRACT

The present invention relates to a composition comprising 10 to less than 50 wt.-% of at least one oligomeric polyisocyanate a-1) based on hexamethylene diisocyanate and more than 50 to 90 wt.-% of at least one polyisocyanate a-2) based on isophorone diisocyanate, comprising monomeric isophorone diisocyanate and at least one oligomeric isophorone diisocyanate, and an isocyanate-reactive component selected from the group consisting of polyester polyol, polyether polyol and mixtures thereof. It has been shown that the above mentioned mixture of the specific isocyanate group containing components improves the thermal and mechanical properties of a cured composition. Thus prepared molded articles are particularly suitable for the preparation of spectacle lenses, inter alia due to these properties.

13 Claims, No Drawings

(56) References Cited

U.S. PATENT DOCUMENTS

| | | |
|---|---|---|
| 6,136,455 A | 10/2000 | Anyashiki et al. |
| 6,204,325 B1 | 3/2001 | Maletzko et al. |
| 6,420,508 B1 * | 7/2002 | Danielmeier ........ C08G 18/222 252/182.2 |
| 6,765,111 B1 | 7/2004 | Pedain et al. |
| 2008/0090989 A1 | 4/2008 | Lesartre et al. |
| 2010/0222540 A1 | 9/2010 | Raukamp et al. |
| 2011/0281965 A1 | 11/2011 | Laas et al. |
| 2012/0238696 A1 | 9/2012 | Obu et al. |
| 2013/0158146 A1 * | 6/2013 | Greszta-Franz ... C08G 18/3876 521/170 |

FOREIGN PATENT DOCUMENTS

| | | |
|---|---|---|
| DE | 2622951 A1 | 11/1977 |
| DE | 2644684 A1 | 4/1978 |
| DE | 2900031 A1 | 7/1980 |
| DE | 3700209 A1 | 7/1988 |
| DE | 3900053 A1 | 7/1990 |
| DE | 102009047214 A1 | 9/2010 |
| EP | 0003765 A1 | 9/1979 |
| EP | 0017998 A1 | 10/1980 |
| EP | 0330966 A2 | 9/1989 |
| EP | 0336205 A2 | 10/1989 |
| EP | 0339396 A1 | 11/1989 |
| EP | 0649866 A1 | 4/1995 |
| EP | 0693512 A1 | 1/1996 |
| EP | 0798299 A1 | 10/1997 |
| EP | 0816411 A1 | 1/1998 |
| EP | 0943637 A1 | 9/1999 |
| EP | 962455 A1 | 12/1999 |
| EP | 0978523 A1 | 2/2000 |
| EP | 1657267 A1 | 5/2006 |
| EP | 1721920 A1 | 11/2006 |
| EP | 2455409 A2 | 5/2012 |
| EP | 2518119 A1 | 10/2012 |
| GB | 1145952 A | 3/1969 |
| WO | WO-0014137 A1 | 3/2000 |
| WO | WO-02098942 A1 | 12/2002 |
| WO | WO-2004076518 A1 | 9/2004 |
| WO | WO-2006134488 A2 | 12/2006 |
| WO | WO-2007015273 A1 | 2/2007 |
| WO | WO-2007133407 A2 | 11/2007 |
| WO | WO-2008033659 A1 | 3/2008 |
| WO | WO-2008092597 A2 | 8/2008 |
| WO | WO-2009059848 A1 | 5/2009 |
| WO | WO-2010043392 A1 | 4/2010 |
| WO | WO-2010083958 A1 | 7/2010 |
| WO | WO-2011078366 A1 | 6/2011 |

* cited by examiner

METHOD FOR PREPARING OPTICAL LENSES

This is a continuation of copending U.S. application Ser. No. 14/396,240, filed Oct. 22, 2014, which is the national stage application (under 35 U.S.C. §371) of International Application PCT/EP2013/058256, filed Apr. 22, 2013, which claims the benefit of European Application No. 12165171.5, filed Apr. 23, 2012. The disclosures of each of the aforesaid U.S., International and European applications are incorporated herein by reference in their entireties.

The invention relates to compositions which can be cured to light resistant polyurethanes and which are particularly suitable for the preparation of optical lenses.

Today in multiple areas transparent plastics replace glass in the manufacture of optical components. Even with optical lenses such as spectacle lenses polymeric materials are advantageous with respect to their lower weight, higher breaking strength and easy processability, and thus more and more substitute the traditionally used mineral glass.

The industrial production of organic eyeglasses from thermoset plastics takes place in a special casting process, wherein liquid reaction mixtures are mixed with additives such as e.g. UV-absorbers, filled into glass molds at temperatures which are as far as possible below their curing temperature and are subsequently cured for many hours in an exactly tempered process.

As standard material for the production of plastic eyeglasses polyallyldiglycolcarbonate (PADC), which is obtainable by radical polymerization of allyldiglycolcarbonate (ADC), has been used for many years. PADC glasses have excellent optical properties and are up to 20% lighter than comparable mineral glasses. With a refractive index of 1.50 and a high Abbe-number 58 they are especially for the correction of ametropia in the low range of up to ±2 diopters.

Despite their widespread use PADC spectacle lenses nevertheless exhibit several technological disadvantages. For example, due to their lower mechanical and thermal strength, particularly the higher brittleness, the comparably low glass transition temperature and heat deflection temperature (HDT), compared to other plastics, they are not suitable for frameless and party frameless glasses (rimless spectacles), but usually can only be used in full-rim frames. In addition, absorption of an UV-radiation of a wavelength of <400 nm, as it is aimed at for glasses in everyday use for protecting the eye, cannot be realized with such material.

However, transparent polyurethane ureas which are used for the manufacturing of extremely impact resistant spectacle lenses, and which are according to WO 2000/014137 obtainable from polyurethane prepolymers based on aliphatic and/or cycloaliphatic diisocyanates and at least one aromatic diamine or according to WO 2004/076518 by curing isocyanate prepolymers with crosslinker mixtures comprising hydroxy functional polyurethane prepolymers and aromatic diamines, show significantly better mechanical and thermal properties.

The use of aromatic diamines as chain-lengthener allows according to the above mentioned methods the preparation of plastic glasses with the desired high hardness and heat resistance, but at the same time leads to an insufficient color stability. A yellowing of the glasses can be repressed for a limited time by adding high amounts of UV-stabilizers and antioxidants, such as described e.g. in WO 2008/033659, but it inevitably occurs sooner or later.

A further disadvantage, being the result of the use of aromatic structural components, is the significantly increased refractive index of about 1.53 compared to the industry standard PADC.

Two-component polyurethane compositions for manufacturing optical materials, wherein cycloaliphatic diisocyanates or their prepolymers are cured with polyols in the presence of catalysts, are known from WO 2007/015273, WO 2008/092597 and WO 2010/043392. Spectacle lenses prepared from such polyurethanes are resistant to yellowing and have a refractive index in the range of 1.50, which thus is comparable to that of PADC. However, the heat resistance of these urea-group free systems is not sufficient. In addition, prepolymers of cycloaliphatic diisocyanates as described in WO 2009/059848 tend to crystallization and cloudiness, which complicates the processing of high quality optical components.

The skilled person in the field of polyurethane chemistry is well aware, that isocyanurate structures are thermally and hydrolytically much more stable than urethane groups (see e.g. "Methoden der organischen Chemie" ("Methods of organic chemistry") (Houben-Weyl) vol. E20, Makromolekulare Stoffe (macromolecular substances), Georg Thieme Verlag (Publishing) Stuttgart 1987, page 1740). Accordingly, not few attempts have been made to use polyisocyanurate polyisocyanates for improving the characteristics of transparent polyurethanes, such as e.g. the temperature resistance.

For example DE-A 2900031 describes transparent polyurethane molded articles with enhanced heat resistance of a mixture of monomeric and trimeric isophorone diisocyanate (IPDI) and polyol mixtures. The available molded articles are nevertheless extremely brittle, not impact resistant and thus not suitable as spectacle lens material.

EP-A 0 943 637 describes reactions of an oligomeric trimer based on hexamethylene diisocyanate (HDI) and a blend of this HDI-trimer with monomeric isophorone diisocyanate with special mixtures of polyether and polyester polyols to compact, transparent poly-addition products which may be used as glass substitute. The obtained molded articles are suitable for producing simple polyurethane glazings, such as discs or covers for luminous elements in the field of real estate, automobile or aircraft engineering, but do not exhibit the optical quality which is necessary for optical lenses such as spectacle lenses.

Two component polyurethane compositions for producing transparent casting compounds, particularly optical lenses, according to the "Reaction Injection Molding" (RIM)-process are object of EP-A 1 657 267. Therein, as the polyisocyanate component mixtures of at least one isocyanurate group containing polyisocyanate with at least one further monomeric diisocyanate are reacted with polyol components comprising diols, preferably only with diols. The use of diols as reaction partner for the higher-functional polyisocyanates is mandatory in the processing according to the RIM-process, in order to prevent molding defects such as e.g. the formation of flow lines or streaks. This method provides transparent polyurethanes with a refractive index in the range of 1.52 which is higher than the industry standard PADC.

DE 10 2009 047 214 describes the reaction of a mixture of trimerized HDI with a deficit of weight amount of trimerized IPDI with specific, comparably low molecular polyether polyol mixtures to transparent compact polyurethanes, which are preferably used as coating for surfaces for automotive interior applications. The suitability as transparent coating does not mean that such polyurethane systems fulfil the high requirements of such systems in optical applications, too. The same holds true for the polyurethane binder mixtures as described in EP-A 1 484 350, as well as the polyurethane coating agents of EP-A 0 693 512, EP A 1 721 920, WO 02/098942 A1, U.S. Pat. No. 5,869,566, U.S. Pat. No. 6,136,455, WO 2007/133407 A2 and EP-A 0 649 866 and the polyurethane lacquers of EP-A 0 336 205 and EP-A 0 816 411.

From WO 2010/083958 specific solvent free polyisocyanate mixtures of at least one low-monomer HDI-polyisocyanate and of at least one low-monomer polyisocyanate based on cycloaliphatic diisocyanates, such as e.g. IPDI, are known, which are suitable for producing hard, light resistant polyurethane- and/or polyurea articles for multiple different applications, inter alia for preparing spectacle lenses and optical lenses. However the described polyisocyanate mixtures exhibit besides sufficiently high amounts of cycloaliphatic polyisocyanates, which are necessary for achieving the required heat resistance, high viscosities such that they cannot be processed in simple casting processes as established in the eyewear industry.

So far no suitable polymers are known which can substitute PADC as industrial standard material for preparing spectacle lenses.

Therefore, there was a strong interest to provide a plastic which has the advantages of plastics compared to mineral glass while having approximately the optical properties of PADC and at the same time having improved mechanical and thermal properties. In addition the resulting plastics should be particularly light resistant and resistant to yellowing. Furthermore, the plastic should be able to block UV-radiation particularly at a wavelength of <400 nm completely, if applicable by adding further auxiliaries and/or additives. The plastic should thus be particularly suitable for the use in optical applications such as optical lenses. The plastic should thus particularly be suitable for use as spectacle lenses. In addition the starting components should preferably have sufficiently low viscosity to be, such as ADC, applicable in a casting process. Therewith such a plastic could be used particularly in such casting processes as established in the spectacle lens industry.

These objects have been solved by providing the composition as described below, its use as well as the process for preparing transparent materials.

The composition according to the present invention comprises

A) 10 to less than 50 wt.-% of at least one oligomeric polyisocyanate
  a-1) based on hexamethylene diisocyanate
  and
  more than 50 to 90 wt.-% of at least one polyisocyanate a-2) based on isophorone diisocyanate containing monomeric isophorone diisocyanate and at least one oligomeric polyisocyanate based on isophorone diisocyanate,
  wherein the %-data relate to the sum of components a-1) and a-2), B) at least one isocyanate-reactive component, selected from the group consisting of polyester polyol, polyether polyol and mixtures thereof, and optionally C) one or more auxiliaries and/or additives.

It has surprisingly been found that by using well defined mixtures of at least one oligomeric polyisocyanate based on hexamethylene diisocyanate (HDI) and a polyisocyanate component based on isophorone diisocyanate, comprising monomeric isophorone diisocyanate (IPDI) and at least one oligomeric polyisocyanate based on IPDI, with an isocyanate-reactive component, selected from the group consisting of polyester polyol, polyether polyol and mixtures thereof, plastics can be obtained, which have the desired properties for optical applications while having good mechanical and thermal properties. These plastics particularly have a lower density, a higher breaking strength and are easier processable, compared to glass. The optical properties of the obtained plastic are comparable to those of PADC. In particular they have a refractive index in the range of 1.50. In addition, the Abbe-numbers as well as the transmission are in the range which can be achieved with PADC. The obtained plastics are furthermore light resistant and resistant to yellowing. Furthermore the obtained plastic is suitable to completely block UV-radiation particularly in a wavelength of <400 nm, by adding further auxiliaries and/or additives. Even more, the obtained plastics are not brittle. They have higher glass transition temperatures and high heat resistance.

These optical, mechanical and thermal properties are the reason that the plastic according to the present invention is suitable for the use in optical applications such as optical lenses. In particular the plastic is suitable for the use as spectacle lenses.

At the same time, the starting components have a low viscosity, so that the composition according to the present invention can be used in a casting process. In particular the use of this composition can be achieved in casting processes as established in the spectacle lens industry.

Component A)

The component A) of the composition of the present invention comprises 10 to less than 50 wt.-%, preferably 10 to 49 wt.-%, more preferably 10 to 45 wt.-%, even more preferred 15 to 35 wt.-%, particularly preferred 20 to 30 wt.-% of at least one oligomeric polyisocyanate a-1) based on hexamethylene diisocyanate and more than 50 to 90 wt.-%, preferably 51 to 90 wt.-%, more preferably 55 to 90 wt.-%, even more preferred 65 to 85 wt.-%, particularly preferred 70 to 80 wt.-% of at least one polyisocyanate a-2) based on isophorone diisocyanate, comprising monomeric isophorone diisocyanate and at least one oligomeric polyisocyanate based on isophorone diisocyanate, wherein the %-data relate to the sum of components a-1) and a-2).

The term polyisocyanate is generally understood to mean a chemical compound which has two or more isocyanate groups. Therefore diisocyanates such as HDI or IPDI are commonly referred to as polyisocyanates, too, since they carry more than one isocyanate group. However, in general, in the field of aliphatic or cycloaliphatic polyisocyanates, respectively, monomeric diisocyanates such as HDI and IPDI are not yet designated as polyisocyanates, but the higher molecular oligomeric polyisocyanates which are prepared therefrom by using suitable modification reactions, such as e.g. trimerization or biuretizing. Therein HDI and IPDI are the starting diisocyanates for preparing the corresponding polyisocyanates. Therefore, in the present patent application the term polyisocyanate is particularly used to designate an oligomeric polyisocyanate.

Oligomeric polyisocyanates are particularly such polyisocyanates in which at least two generally equal diisocyanate units are bond to each other by reacting a part of the isocyanate groups, optionally by adding for example monohydric or polyhydric alcohols. Particularly preferably oligomeric polyisocyanates are dimers, trimers or mixtures of dimers and trimers of a diisocyanate. This particularly means that the oligomeric polyisocyanates have a higher molecular weight than the corresponding diisocyanates. An oligomeric polyisocyanate based on HDI does preferably have a molecular weight higher than 168.20 g/mol. An oligomeric polyisocyanate based on IPDI does preferably have a molecular weight higher than 222.29 g/mol. In the sense of the present invention it is particularly preferred that the oligomeric polyisocyanates are obtained by reacting only one type of diisocyanate (i.e. either only HDI or only IPDI) as the diisocyanate unit. It is also preferred that the oligomeric polyisocyanates are no prepolymers. In particular this means that the molecular weight of the oligomeric polyisocyanates or polydiisocyanates obtained by reacting only one sort of diisocyanate as diisocyanate unit is below 1500 g/mol.

Depending on the nature of the used reaction conditions different links of the diisocyanate units can occur. Furthermore the oligomeric polyisocyanates also include the reaction products of diisocyanates with preferably low molecular weight polyols (urethanes). Such polyols preferably have a molecular weight range of 62 to 400 g/mol.

Preferred is the formation of uretdion-, isocyanurate-, iminooxadiazindion-, urethane-, allophanate-, biuret- and/or oxadiazintrion groups. In the following oligomeric polyisocyanates which have at least one of the named groups are also sometimes referred to as "derivatives" of the corresponding diisocyanates.

In general in the synthesis the oligomeric polyisocyanates do not occur in the form of defined compounds but as mixtures of different oligomers which have a molecular weight distribution. The oligomeric polyisocyanates particularly include the following types of structures (see also: Nachrichten aus der Chemie (News from Chemistry), 55, 380-384, 2007):

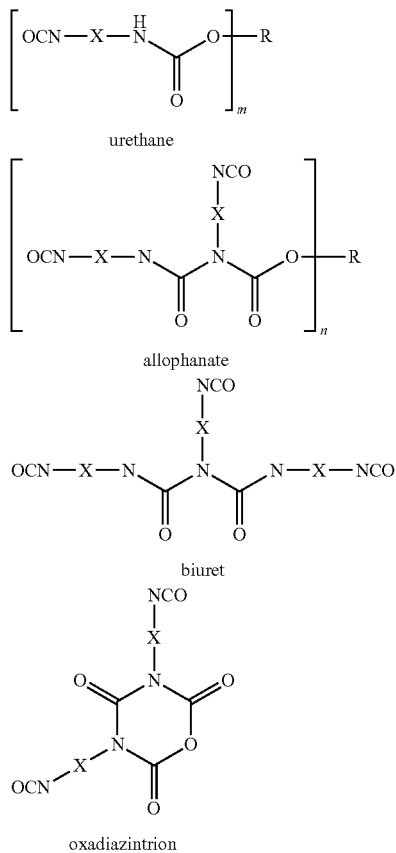

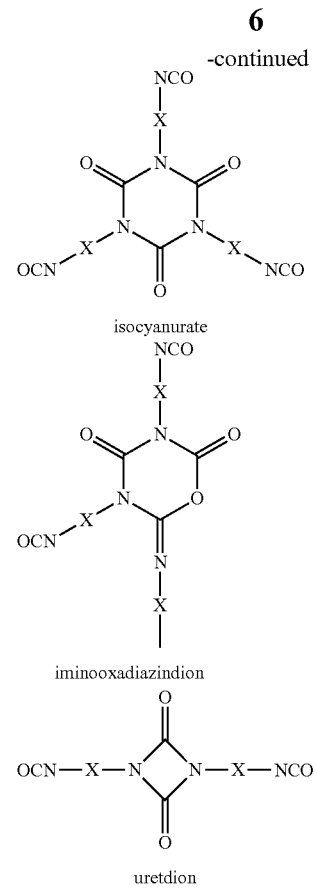

wherein X particularly has the following meaning:

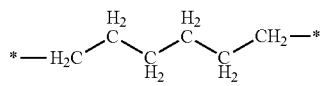

when it is an oligomeric polyisocyanate based on HDI or

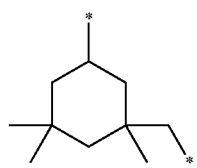 [SMILES: *CC1(C)CC(*)CC(C)(C)C1]

when it is an oligomeric polyisocyanate based on IPDI;
R can be any organic radical,
n is an integer between 1 and 10, preferably 2 or 3
and m is an integer between 2 and 10, preferably 2 or 3,
and mixtures of these types of structures.

The oligomeric polyisocyanates have at least two, particularly preferred at least three isocyanate groups per molecule (NCO-functionality).

Oligomeric Polyisocyanate Component a-1)

The oligomeric polyisocyanates a-1) based on HDI are preferably the known derivatives of HDIs, which are selected from the group consisting of uretdion-, isocyanurate-, iminooxadiazindion-, urethane-, allophanate-, biuret-, oxaziazintrion groups comprising derivatives and mixtures of such derivatives. These derivatives and their manufacturing processes are exemplified in Laas et al., J. Prakt. Chem. 336, 1994, 185-200, DE-A 1 670 666, DE-A 3 700 209, DE-A 3 900 053, EP-A 0 330 966, EP-A 0 336 205, EP-A 0 339 396 and EP-A 0 798 299. Preferred are oligomeric polyisocyanate components a-1) based on HDI in the form of derivatives of the HDI, having biuret-, isocyanurate- and/or iminooxadiazindion structures. Particularly preferred are oligomeric polyisocyanate components a-1) based on HDI in the form of derivatives of the HDI, having isocyanurate groups and/or iminooxadiazindion groups.

The HDI used for preparing the oligomeric polyisocyanate a-1) based on HDI is preferably prepared by phosgenation of hexamethylenediamine. It is further possible to use HDI for the preparation of oligomeric polyisocyanate a-1) based on HDI, which has been prepared by thermal cleavage of the urethane bonds of HDIs which have been obtained from the phosgene free route.

In one preferred embodiment of the present invention the oligomeric polyisocyanate component a-1) based on HDI has an amount of monomeric HDI of less than 0.5 wt.-% based on the total polyisocyanate component a-1) based on HDI.

The oligomeric polyisocyanate component a-1) based on HDI preferably has a viscosity of 100 to 3500 mPa·s, preferably 600 to 3000 mPa·s, more preferably 600 to 1500 mPa·s at 23° C. The amount of isocyanate groups of the oligomeric polyisocyanate component a-1) based on HDI is preferably 20 to 24 wt.-%, more preferably 21 to 24 wt.-%, even more preferred 22 to 24 wt.-%. The oligomeric polyisocyanate component a-1) based on HDI has an average isocyanate functionality per molecule of at least 2.0.

Particularly preferably the polyisocyanates of component a-1) based on HDI are a derivative of the HDI, having isocyanurate groups and/or iminooxadiazindion groups, with a viscosity of 600 to 1500 mPa·s at 23° C. and an amount of isocyanate groups of 22 to 24 wt.-%.

Polyisocyanate Component a-2)

The polyisocyanate component a-2) based on IPDI comprises monomeric IPDI and at least one oligomeric polyisocyanate based on IPDI.

Relating to the polyisocyanate component a-2) based on IPDI the term "comprising" is preferably understood to refer to "consist essentially of". This means that the polyisocyanate component a-2) based on IPDI particularly preferably consist essentially of monomeric IPDI and at least one oligomeric polyisocyanate based on IPDI. Therein the polyisocyanate component a-2) based in IPDI may include small amounts of usual impurities, which for example may often occur during the manufacturing of IPDI and/or in the manufacturing of oligomeric polyisocyanates based on IPDI.

The oligomeric polyisocyanate based on IPDI preferably is a derivative, selected from the group consisting of derivatives with biuret-, isocyanurate structures and mixtures thereof.

The preparation of these polyisocyanate components a-2) based on IPDI may particularly be carried out by starting from monomeric IPDI using per se known methods for biuretizing and/or trimerization by reacting a part of the originally present isocyanate groups in the IPDI by forming oligomeric polyisocyanate molecules.

Common suitable methods for catalytic trimerization of isocyanates for forming isocyanurate structures or for biuretizing diisocyanates are exemplified for example in Laas et al., J. Prakt. Chem. 336, 1994, 185-200. Additional descriptions of suitable IPDI-polyisocyanates can be found for example in EP-A 0 003 765, EP-A 0 017 998 and DE-A 2 644 684.

The IPDI used for preparing the polyisocyanate component a-2) based on IPDI is preferably prepared by phosgenation of isophoronediamine. It is further possible to use IPDI for the preparation of the polyisocyanate components a-2) based on IPDI, which has been prepared by thermal cleavage of the urethane bonds of diurethanes of the IPDI which have been obtained on the phosgene free route. Regardless of the type of the above described kind of chosen oligmerization reaction (trimerization and/or biuretization) in this embodiment the preparation of the polyisocyanate components a-2) based on IPDI, used according to the present invention, can be carried out as follows:

Preparation 1: Unlike as for example usual in the preparation of lacquer polyisocyanates and as described in the above cited patent literature it can be abstained from separating unreacted monomeric IPDIs after oligomerization occurred. Therewith it is possible to obtain clear, essentially colorless isocyanurate- and/or biuret-groups containing solutions comprising monomeric IPDI and at least one oligomeric polyisocyanate based on IPDI. This is a preferred approach. This allows preparation of the polyisocyanate component a-2) based in IPDI in one process step.

Preparation 2: In an alternative approach the preparation of the polyisocyanate component a-2) based on IPDI is carried out by preparing at least one oligomeric polyisocyanate based on IPDI preferably according to the above described known process. The obtained at least one oligomeric polyisocyanate based on IPDI is purified by conventional procedures, so that it is essentially low monomeric. The at least one oligomeric polyisocyanate based on IPDI in this case is usually present as a solid at room temperature. It can be dissolved in monomeric IPDI to obtain the polyisocyanate component a-2) based on IPDI. However, this approach is not preferred because it is more complex than the process described previously.

In a preferred embodiment the polyisocyanate component a-2) based on IPDI comprises a larger amount of the monomeric IPDIs, based on the mass, compared to the amount of the oligomeric polyisocyanates based on IPDI. Thus, in this embodiment the polyisocyanate component a-2) based on IPDI comprises, based on a total mass of the polyisocyanate component a-2) based on IPDI, monomeric IPDI in excess of the oligomeric polyisocyanate based on IPDI.

Such polyisocyanate component a-2) based on IPDI can preferably be obtained by the preparation process according to preparation 1 and 2. Particularly preferably it is obtained by preparation 1.

The polyisocyanate component a-2) based on IPDI preferably comprises 10 to 45 wt.-%, more preferably 20 to 40 wt.-% oligomeric polyisocyanate based on IPDI and preferably 90 to 55 wt.-%, more preferably 80 to 60 wt.-% of the monomeric IPDI's based on the total mass of both.

The polyisocyanate component a-2) based on IPDI, wherein, based on the mass, preferably the amount of the monomeric IPDI's is higher than the amount of the at least one oligomeric polyisocyanate based on IPDI, preferably has an amount of isocyanate groups of 27 to 36 wt.-% and more preferably of 29 to 33 wt.-% based on the polyisocyanate component a-2) based on IPDI.

The polyisocyanate component a-2) based on IPDI preferably has a viscosity of 100 to 3000 mPa·s, more preferably 300 to 2800 mPa·s, even more preferred 500 to 2650 mPa·s at 23° C. Further it preferably has an amount of isocyanate groups of 26 to 36 wt.-%, more preferably 27 to 34 wt.-%, even more preferred 28 to 32 wt.-% based on the polyisocyanate component a-2) based on IPDI.

The component A) comprising 10 to less than 50 wt.-% of at least one oligomeric polyisocyanate a-1) based on HDI and more than 50 to 90 wt.-% of at least one polyisocyanate component a-2) based on isophorone diisocyanate, comprising monomeric isophorone diisocyanate (IPDI) and at least one oligomeric polyisocyanate based on IPDI can preferably be obtained by simple mixing of the components a-1) and a-2). The mixing can preferably be supported by stirring. Preferably a homogeneous mixture should be obtained. In particular the homogeneity of the mixture can be improved by preheating the components a-1) and a-2) to temperatures of preferably 30 to 120° C. before mixing. Preferably the temperature of the mixture of a-1) and a-2) is maintained at preferably 30 to 100° C., more preferably 40 to 80° C. by additional heating. However, it is a particular advantage that the mixing of components a-1) and a-2) as well as particularly the casting can occur at room temperature, when the polyisocyanate component a-2) based on its mass has an amount of monomeric IPDI which is larger than the amount of the oligomeric polyisocyanate based on IPDI. This particularly results from the viscosity of component a-2) at room temperature.

Accordingly, component A) is preferably present in the form of a clear, essentially colorless mixture. The component A) preferably has a viscosity of 100 to 3000 mPa·s, more preferably 150 to 2700 mPa·s, even more preferred 200 to 2300 mPa·s at 23° C.

The amount of isocyanate groups of component A) is preferably in the range of 24 to 34 wt.-%, more preferably 25 to 32 wt.-%, even more preferred 26 to 30 wt.-% based on the total weight of component A).

In one preferred embodiment component A) comprises 10 to less than 50 wt.-% of at least one oligomeric polyisocyanate a-1) based on HDI and more than 50 to 90 wt.-% of at least one polyisocyanate component a-2) based on isophorone diisocyanate, comprising monomeric isophorone diisocyanate (IPDI) and at least one oligomeric polyisocyanate based on IPDI, wherein, based on the mass, the amount of the monomeric IPDIs is higher than the amount of the oligomeric polyisocyanates based on IPDI. As described above, this embodiment has the advantage that the processing of component a-2) as well as the composition is possible at room temperature due to the high amount of the monomeric IPDI in the component a-2) as well as in the total composition. The resulting properties of the cured composition are preferably not substantially influenced. Thus, particularly preferably the mechanical as well as the optical properties of the cured composition of this embodiment are essentially identical to those of a cured composition wherein in component a-2) the amount of the monomeric IPDIs is less than the amount of the oligomeric polyisocyanates based on IPDI.

Component A) is preferably solvent-free.

Component B)

The composition according to the present invention comprises at least one isocyanate reactive component, selected from the group consisting of polyester polyol, polyether polyol and mixtures thereof.

This component B) is preferably capable to react with component A), which comprises isocyanate groups, due to the in the statistical average at least two OH-groups per molecule of the polyester polyol, the polyether polyol or the mixture thereof.

Particularly preferably the component B) has an average functionality in respect of OH-groups from 2.3 to 6.0. The equivalent ratio of isocyanate groups of component A) to hydroxy groups of component B) is preferably from 0.5:1 to 2.0:1, more preferably 1:1.

Component B) is preferably solvent-free.

In a preferred embodiment the isocyanate reactive compound is free of aromatic structures. Aromatic structures are particularly responsible for that the resulting plastics are not light resistant and resistant to yellowing. Moreover, plastics which have aromatic structures have the disadvantage that their refractive indices are greater than 1.50.

In a preferred embodiment component B) comprises either polyester polyols or polyether polyols. This means that in this embodiment no mixtures of both components are present. Herein the polyester polyol is substantially free of polyether polyol or the polyether polyol is substantially free of polyester polyol. This embodiment is advantageous as polyester polyols and polyether polyols are partly hardly miscible with each other. This can lead to negative effects on the properties of the cured compositions.

Polyester Polyol

Polyester polyols within the meaning of the present invention are compounds having at least two, preferably more than two ester groups and at least two OH-groups, preferably more than two OH-groups per molecule.

Preferred are polyester polyols which are formed on the basis of a dicarboxylic acid. These are preferably aliphatic dicarboxylic acids. Such dicarboxylic acids preferably have 4 to 10 carbon atoms.

Polyester polyols of component B) are well-known. They are prepared in known manner, preferably by methods as described for example in "Ullmanns Encyclopädie der Technischen Chemie" ("Ullman's Encyclopedia of Technical Chemistry"), Verlag (Publishing) Chemie Weinheim, 4. Edition (1980), vol. 19, pages 61 ff. or H. Wagner and H. F. Sarx in "Lackkunstharze" ("Synthetic Paint Resin"), Carl Hanser Verlag (Publishing), München (1971), pages 86 to 152. If applicable, catalytic amounts of usual esterification catalysts such as e.g. acids, bases or transition metal compounds such as e.g. titanetetrabutylat, may be used. The esterification reaction is preferably carried out in a temperature range of approximately 80 to 260° C., preferably 100 to 230° C., until the desired values for the hydroxyl number and acid number are obtained.

Starting compounds for preparing the polyester polyols of component B) to be used according to the present invention are any desired, preferably aliphatic or cycloaliphatic, saturated or unsaturated dicarboxylic acids or their anhydrides with 4 to 10 carbon atoms, preferably with 4 to 6 carbon atoms, as well as polyhydric aliphatic or cycloaliphatic alcohols, preferably diols and triols with 2 to 18 carbon atoms, preferably 2 to 6 carbon atoms.

Suitable dicarboxylic acids or anhydrides, respectively, are preferably selected from the group consisting of succinic acid, succinic anhydride, glutaric acid, adipic acid, pimelic acid, suberic acid, azelaic acid, sebacic acid, decandicarboxylic acid, maleic acid, maleicanhydride, fumaric acid, itaconic acid, itaconic anhydride, hexahydrophthalic acid, hexahydrophthalic anhydride, tetrahydrophthalic acid and tetrahydrophthalic anhydride which can be present either individually or in the form of any mixture thereof.

Suitable polyhydric alcohols for preparing the polyester polyols can be selected from the group consisting of 1,2-ethanediol, 1,2- and 1,3-propanediol, the isomeric butanediols, pentanediols, hexanediols, heptanediols and octanediols, 2-butyl-2-ethyl-1,3-propanediol, 1,10-decanediol, 1,12-dodecanediol, 1,2- and 1,4-cyclohexanediol, 1,4-cyclohexanedimethanol, 4,4'-(1-methylethylidene)biscyclohexanol, 1,2,3-propanetriol (glycerine), 1,1,1-trimethylolethane, 1,2,6,hexanetriol, 1,1,1-trimethylolpropane, 2,2-bis(hydroxymethyl)-1,3-propanediol, low molecular polyether diols such as e.g. diethyleneglycol and dipropyleneglycol and any mixture of such alcohols.

Preferred are polyester polyols on the basis of succinic acid and/or adipic acid and 1,3-butanediol, 1,4-butanediol, 2,2-dimethyl-1,3-propanediol, 2,2,4-dimethyl-1,5-pentandiol, diethyleneglycol, glycerin and/or 1,1,1-trimethylolpropane as alcoholic building component.

Other suitable polyester polyols can be prepared in a known manner from lactones and simple polyhydric alcohols as starter molecules by ring opening.

Suitable lactones for preparing such ester polyols are for example β-propiolactone, γ-butyrolactone, δ-valerolactone, ε-caprolacctone, 3,5,5- and 3,3,5-trimethylcaprolactone or any mixtures of such lactones. Preferably used lactone is ε-caprolactone. As starter molecule for example the above exemplified polyhydric alcohols or any mixture thereof can be used.

The preparation of such lactone polyester polyols by ring opening polymerization is usually carried out in the presence of catalysts such as for example Lewis or Broenstedt acids, organic tin or titanium compounds at temperatures of 20 to 200° C., preferably 50 to 200° C.

In addition, in the preparation of the polyester polyols to be used according to the present invention on basis of aliphatic dicarboxylic acids optionally, for example for lowering the viscosity, ε-caprolactone can be added in minor amounts. If at all, ε-caprolactone is then used in such amounts that in the resulting polyester polyols not more than 20 wt.-% ε-caprolactone is bound in form of polycaprolactone structures.

The average functionality of the polyester polyols in relation to the OH-groups is preferably 2.0 to 4.0, more preferably 2.2 to 3.5, even more preferred 2.3 to 3.3.

Therein, the polyester polyol preferably has an OH-number of 100 to 850 mg KOH/g, preferably 350 to 800 mg KOH/g, particularly preferred 400 to 750 mg KOH/g. According to the present invention the OH-number determination is carried out according to DIN 53240 T.2.

Furthermore the polyester polyol preferably has an acid number of not more than 5, preferably not more than 3. According to the present invention the acid number determination is carried out according to DIN 3682.

The polyester polyols present in the composition according to the present invention are preferably liquid at the processing temperature. Preferably they have a viscosity of less than 6000 mPa·s, more preferably less than 4000 mPa·s and most preferred less than 3000 mPa·s at 25° C.

The reaction of component A) with component B), which comprises at least one polyester polyol, is preferably carried out by maintaining an equivalent ratio of isocyanate groups to isocyanate reactive groups of 0.5:1 to 2.0:1, more preferably 0.7:1 to 1.3:1, even more preferred 0.9:1 to 1.1:1.

Polyether Polyol

Polyether polyols within the meaning of the present invention are compounds which have at least two, preferably more than two ether groups and at least two OH-groups, preferably more than two OH-groups. The at least two ether groups constitute the main chain of the polyether polyols.

Polyether polyols of component B) are known and can be obtained according to the methods as described for example in DE-A 2 622 951, column 6, line 65 to column 7, line 47 or in EP-A 0 978 523, page 4, line 45 to page 5, line 14 for example by alkoxylation of suitable starter molecules with alkyleneoxide.

The alkoxylation reaction can be carried out both with basic as well as acid catalysis. Suitable basic catalysts are for example alkalihydroxides such as e.g. sodium or potassium hydroxide or alkali alcoholates such as e.g. sodium methylate, suitable acid catalysts are for example Lewis acids such as for example antimone pentachloride or borontrifluoride etherat or double metal cyanide (DMC) catalysts such as for example tinhexacyanocobaltate. Such catalysts are usually removed after the synthesis by neutralization, distillation and/or filtration.

As starter molecules for preparing the polyether polyols used according to the present invention any compounds with a molecular weight range of 60 to 200 are suitable. Preferred are starter compounds which are free of aromatic structures. Furthermore, these starter compounds preferably have 3 to 6, more preferably up to 4 reactive hydrogen atoms. These are preferably simple aliphatic alcohols with 3 to 6 carbon atoms, which are for example selected from the group consisting of 1,2,3-propanediol, 1,1,1-trimethlolethane, 1,2,6-hexanetriol, 1,1,1-trimethylolpropane, 2,2-bis(hydroxymethyl)-1,3-propanediol, 1,2,4- and 1,3,5-trihydroxy-cyclohexane and sorbitol, aliphatic diamines which are for example selected from the group consisting of ethylene diamine, 1,3-propylenediamine and the isomeric butylene diamines, pentylene diamine and hexylene diamine which are optionally mono substituted by alkyl residues with 1 to 4 carbon atoms at one nitrogen atom, or aliphatic polyamines which can be selected for example from the group consisting of diethylenetriamine and triethylenetetramine. A further preferred class of suitable starter molecules are alkanolamines such as for example ethanolamine, dialkanolamine as for example diethanolamine and trialkanolamine, such as for example triethanolamine.

These starter molecules can be used individually as well as in form of any mixture thereof.

Suitable alkyleneoxides for the alkoxylation reaction are in particular ethyleneoxide and propyleneoxide. These can be reacted with the named starter molecules either alone or sequentially in any order or in form of any mixture thereof.

Particularly preferred polyether polyols are adducts of ethyleneoxide and/or propyleneoxide as 1,2,3-propanetriol, 1,1,1-trimethylolpropane, ethylenediamine and/or pentaerythrite.

Especially polyether polyols which are prepared by using only propyleneoxide as alkyleneoxide are preferred.

In addition also polytetramethlene etherglycols which can be obtained for example according to Angew. Chem. 72, 927 (1960) by polymerization of tetrahydrofuran are suitable polyether polyols.

In the preparation of the compounds according to the present invention optionally simple low molecular at least trifunctional alcohols can be added besides the polyether polyols. These preferably have a molecular weight of 92 to 182. These are present, if at all, in amounts of not more than up to 10 wt.-%, preferably up to 5 wt.-%, based on the amount of polyether polyol. In a preferred embodiment the polyether polyol is free of low molecular at least trifunctional alcohols.

The polyether polyol preferably has an average functionality in relation to the OH-groups of 3.0 to 6.0, more preferably 3.0 to 4.0, most preferred 3.0 to 3.5. Herein it preferably has an OH-number of 80 to 1000 mg KOH/g, more preferably 110 to 800 mg KOH/g, most preferred 150 to 600 mg KOH/g. According to the present invention the OH-number determination is carried out according to DIN 53240 T.2.

The polyether polyol preferably has a viscosity of 1000 to 6000 mPa·s, more preferably 1500 to 5800 mPa·s, most preferred 1900 to 5500 mPa·s at 23° C.

The reaction of component A) with component B), which comprises at least one polyether polyol, is preferably carried out by maintaining an equivalent ratio of isocyanate groups to isocyanate reactive groups of 0.5:1 to 2.0:1, more preferably 0.7:1 to 1.3:1, even more preferred 0.8:1 to 1.2:1.

Component C)

Besides the named components A) and B) optionally one or more auxiliaries and/or additives C) can be used. These are preferably selected from the group consisting of catalysts, UV-stabilizers, antioxidants, mold release agents, and any mixture thereof.

As catalysts conventional, in the polyurethane chemistry well known catalysts can be used. Preferred catalysts may be selected from the group consisting of tertiary amines, such as triethylamine, tributylamine, dimethylbenzylamine, diethylbenzylamine, pyridine, methylpyridine, dicyclohexylmethylamine, dimethylcyclohexylamine, N,N,N',N'-tetramethyldiaminodiethylether, bis-(dimethylaminopropyl) urea, N-methylmorpholine, N-ethylmorpholine, N-cocomorpholine, N-cyclohexylmorpholine, N,N,N',N'-tetramethylethylenediamine, N,N,N',N'-tetramethyl-1,3-butanediamine, N,N,N',N'-tetramethl-1,6-hexanediamine, pentamethyldiethylenetriamine, N-methylpiperidine, N-dimethylaminoethylpiperidine, N,N'-dimethylpiperazin, N-methyl-N'-dimethylaminopiperazin, 1,8-diazabicyclo (5.4.0)undecen-7 (DBU), 1,2-dimethylimidazol, 2-methylimodazol, N,N-dimethylimidazol-β-phenylethylamine, 1,4-diaza bicyclo-(2,2,2)octan, bis-(N,N-dimethylaminoethyl) adipat; alkanolamine compounds such as for example triethanolamine, triisopropanolamine, N-methyl and N-ethyl-diethanolamine, dimethylaminoethanol, 2-(N,N-dimethylaminoethoxyethanol, N,N',N''-tris-(dialkylaminoalkyl)hexahydrotriazine, N,N',N''-tris-(dimethylaminopropyl)-S-hexahydrotriazin, bis(dimethylaminoethyl)ether; metal salts such as for example anorganic and/or organic compounds of iron, lead, bismuth, zinc and/or tin in usual oxidation states of the metals, for example iron(II) chloride, iron(III) chloride, bismuth(III)-, bismuth(III)-2-ethylhexanoate, bismuth(III)-octoat, bismuth(III)-neodecanoat, zinc chloride, zinc-2-ethylcaproat, tin(II)-octoat, tin(II)-ethylcaproat, tin(II)-palmitat, dibutyltin(IV)-dilautat (DBTL), dibutyltin(IV)-dichloride, lead octoat, amidine such as for example 2,3-dimethyl-3,4,5,6-tetrahydropyrimidin; tetraalkylammoniumhydroxide such as for example tetramethylammoniumhydroxid; alkalihydroxide such as for example sodium hydroxide, alkali alcoholate such as for example sodium methylate, potassium isopropylat and alkali salts of long chained fatty acids with 10 to 20 carbon atoms and optionally side chain OH-groups.

Particularly preferred catalysts C) to be used are tertiary amines, tin, zinc and bismuth compounds of the named kind.

The named catalysts can be used in the preparation of the transparent materials according to the present invention either individually or in form of any mixture thereof. If at all they are preferably used in amounts of 0.01 to 5.0 wt.-%, more preferably 0.1 to 2 wt.-%, calculated as total amount of used catalyst related to the total amount of used component A) and B) of the composition according to the present invention.

The transparent materials obtained from the composition according to the present invention per se have a good light resistance, which means even without addition of appropriate stabilizers. Nevertheless in its preparation optionally UV-stabilizers (light stabilizers) or antioxidants of known type can be added as further auxiliaries and additives C).

Suitable UV-stabilizers can preferably be selected from the group consisting of piperidine derivatives such as for example 4-benzoyloxy-2,2,6,6-tetramethylpiperidine, 4-benzoyloxy-1,2,2,6,6-penta methylpiperidine, bis-(2,2,6, 6-tetra-methyl-4-piperidyil)-sebacat, bis(1,2,2,6,6-pentamethyl-1,4-piperidinyl)-sebacat, bis-(2,2,6,6-tetra methyl-4-piperidyl)-suberat, bis-(2,2,6,6-tetra methyl-4-piperidyl)-dodecandioat, benzophenon derivatives such as 2,4-dihydroxy-, 2-hydroxy-4-methoxy, 2-hydroxy-4-octoxy, 2-hydroxy-4-dodecyloxy or 2,2'-dihydroxy-4-dodecyloxybenzophenon, benztriazol derivatives such as for example 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl)phenol, 2-(5-chlor-2H-benzotriazol-2-yl)-6-(1,1-dimethylethl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl-3-(3-(2H-benzotriazol-2-yl)-5-(1,1-dimethylethyl)-4-hydroxyphenylpropionat), 2-(2H-benzotriazol-2-yl)-4,6-bis (1,1-dimethylethyl)phenol, 2-(2H-benzotriazol-2-yl)-4,6-bis (1-methyl-1-phenylethyl)phenol, 2-(5-chlor-2H-benzotriazol-2-yl)-4,6-bis(1,1-dimethylethylphenol, oxalaniliden such as for example 2-ethyl-2'-ethoxy or 4-methyl-4'-methoxyoxalanilid; salicylates such as for example salicylicacid phenylester, salicylicacid-4-tert-butylphenylester, salicylicacid-4-tert-octylphenylester, cinnamic derivatives such as for example α-cyano-β-methyl-4-methoxy-cinnamic methylester, α-cyano-β-methyl-4-methoxy-cinnamic-ester, α-cyano-β-phenyl-cinnamic-ethylester, α-cyano-β-phenyl-cinnamic-octylester and maloneester derivatives such as for example 4-methoxy-benzylidenemalonacid dimethylester, 4-methoxybenzylidenmalonacid diethylester, 4-butoxy-benzylidenemalonacid dimethylester. These preferred light stabilizers can be used individually as well as in any combination.

Especially preferred UV-stabilizers for the transparent materials which can be prepared according to the present invention completely absorb radiation at a wavelength <400 nm so that in the use of such compositions of the present invention as spectacle lenses complete protection of the eye against UV-radiation is given. In this context for example the named benztriazol derivatives can be mentioned. Specially preferred UV-stabilizers are 2-(5-chlor-2H-benzotriazol-2-yl)-6-(1,1-dimethylethyl)-4-methylphenol, 2-(2H-benzotriazol-2-yl)-4-(1,1,3,3-tetra methyl butyl)phenol and/or 2-(5-chlor-2H-benzotriazol-2-yl)-4,6-bis(1,1-dimethylethyl) phenol.

If at all, the exemplified UV stabilizers of the composition according to the present invention are preferably used in amounts of 0.001 to 3.0 wt.-%, more preferably 0.01 to 2 wt.-%, calculated as total amount of used UV stabilizers related to the total amount of the used components A) and B) of the compositions of the present invention.

Suitable antioxidants are preferably sterically hindered phenols, which can be preferably selected from the group consisting of 2,6-di-tert-butyl-4-methylphenol (lonol), pentaerythrit-tetrakis(3-(3,5-di-tert-butyl-4-hydroxy-phenyl) propionate), octadecyl-3-(3,5-di-tert-butyl-4-hydroxyphenyl)-propionate, triethyleneglycol-bis(3-tert-butyl-4-hydroxy-5-methylphenyl)propionate, 2,2'-thio-bis(4-methyl-6-tert-butylphenol) and 2,2'-thiodiethyl-bis[3-(3,5- di-tert-butyl-4-hydroxyphenyl)propionate]. These can be used either individually or in any combination with one another as needed.

These antioxidants are preferably used in amounts of 0.01 to 3.0 wt.-%, more preferably 0.02 to 2 wt.-%, calculated as total amount of used antioxidant related to the total amount of the used components A) and B) of the composition according to the present invention.

The composition of the present invention can optionally comprise as further auxiliaries and additives C) internal mold release agents.

These are preferably, known as mold release agents, perfluroalkyl- or polysiloxane units comprising non-ionic surfactants, quaternary alkyl ammonium salts such as for example trimethylethyl ammonium chloride, trimethylstearyl ammonium chloride, dimethylethylcetyl ammonium chloride, triethyldodecyl ammonium chloride, trioctylmethyl ammonium chloride and diethylcyclohexyldodecyl ammonium chloride, acid mono and dialkylphosphate with 2 to 18 carbon atoms in the alkyl chain such as for example ethylphosphate, diethylphosphate, isopropylphosphate, diisopropylphosphat, butylphosphate, dibutylphosphate, octylphosphate, dioctylphosphate, isodecylphosphate, diisodecylphosphate, dodecylphosphate, didoceylphosphate, tridecanolphosphate, bis(tridecanol)phosphate, stearylphosphate, distearylphosphate and any mixture of such mold release agents.

Especially preferred mold release agents are the named acid mono and dialkylphosphates, most preferred such with 8 to 12 carbon atoms in the alkyl chain.

Internal mold release agents are used in compositions according to the present invention, if at all, preferably in amounts of 0.01 to 3 wt.-%, more preferably 0.02 to 2 wt.-%, calculated as total amount of the used internal mold release agent related to the total amount of used components A) and B) compositions of the present invention.

To compensate a yellowness which may arise in the polyurethanes obtainable according to the present invention, for example by adding the above described UV stabilizers, the compounds of the present invention can preferably include as further auxiliary and additive C) optional per se known blueing agents. To prevent a reduction of transmission or graying of the materials these are preferably used only in extremely low concentrations, for example in amounts of 5 ppb to 50 ppm. The addition is carried out preferably in form of a master batch which means as a pre-formulated diluted solution in any of the other formulation parts, for example component A) and/or component B). Suitable blueing agents for compositions of the present invention can be preferably selected from the group consisting of commercially available anthrachinone dyes such as for example Exalite Blue 78-13 of the company Exciton, Inc. Dayton, Ohio, USA or Macrolex Violet B, Macrolex Blue RR and Macrolex Violet 3R of the company Lanxess AG, Leverkusen, Germany and any mixture thereof.

All of the above named, optionally added auxiliaries and/or additives C) can be mixed with component A) or with component B). Preferably components C) selected from the group consisting of internal mold release agents, catalysts and mixtures thereof are admixed with component A). Component C) which is selected from the group consisting of UV stabilizers, antioxidants, dyes and mixtures thereof are preferably admixed with component B).

In a preferred embodiment a composition is provided wherein at least one, preferably all of the following features are realized component A) consisting of a-1) and a-2) has a viscosity of 100 to 3000 mPa·s at 23° C. and an amount of isocyanate groups of 25 to 34 wt.-%,
component a-1) has an NCO-amount of 20 to 24 wt.-%,
component a-2) is a solution of an oligomeric polyisocyanate based on isophorone diisocyanate in an access weight amount (>50 wt.-% based on the total amount of a-2)) of monomeric isophorone diisocyanate with an NCO-amount of component a-2) of 27 to 36 wt.-%,
component B) fulfills one, preferably all features
  is a polyester polyol based on aliphatic dicarboxylic acids with 4 to 10 carbon atoms and/or ε-caprolactone,
  is a polyester polyol free of aromatic structures,
  the polyester polyol has an average functionality of 2.3 to 4.0,
  the polyester polyol has an OH-number of 100 to 850 mg KOH/g,
or one, preferably all features
  is a polyether polyol,
  is a polyether polyol which is free of aromatic structures,
  the polyether polyol has an average functionality of 3 to 6,
  the polyether polyol has an OH-number of 80 to 1000 mg KOH/g
and
  has optionally one or more auxiliaries and/or additives C), preferably at last one catalyst, at least one UV stabilizer, at least one antioxidants and at least one mold release agent,
  the equivalent ratio of isocyanate groups in A) to hydroxyl groups in B) is 0.5:1 to 2.0:1.

In a further embodiment of the present invention the composition according to the invention consists of components A), B) and C).

In a further embodiment the present invention relates to a kit-of-parts combination comprising the components A) and B), as defined above, in separated spatial arrangement. This can be a two-component-system. In such case, the optionally present component C) as defined above, can be added to one or both of components A) and B). A preferred component C) is selected from the group consisting of internal release agents, catalysts and mixtures thereof added to component A). Component C) which is selected from the group consisting of UV stabilizers, antioxidants, dyes and mixtures thereof is preferably added to component B). Furthermore it is possible that the optionally present component C) is partly or completely present in a third, spatially separated component of the kit-of-parts system. Therein the auxiliaries and/or additives can be separated so that some can be admixed with the components A) and/or B) and others are present as third component.

Polyurethanes of the Present Invention

The composition of the present invention, comprising the described components A) and B) and optionally the component C) is preferably mixed by using suitable mixing units in ratios, as above preferably defined by the equivalent ratio of diisocyanate groups compared to the isocyanate reactive groups or by wt.-%. Subsequently the mass of the present invention can be cured by any method, preferably in open or closed molds, preferably by simple pouring per hand or by using appropriate equipment such as for example low pressure or high pressure machines which are customary in polyurethane technology or by carrying out the RIM-procedure. Preferably, temperatures of up to 160° C., more preferably 10 to 140° C., even more preferred 20 to 130° C.

are used. Optionally the curing can be carried out under elevated pressure, preferably up to 300 bar, more preferably up to 100 bar, even more preferred up to 40 bar.

The composition of the present invention can be used for the preparation of the polyurethanes according to the present invention. Such polyurethanes are formed by reacting the isocyanate groups of component A) with the OH-groups of component B). This results essentially in urethane groups. Nevertheless, it is also possible that other functional groups besides the urethane groups can be present in the polyurethane of the present invention due to side reactions. However this is less preferred.

The composition of the present invention can be used for preparing transparent materials which consist of the polyurethane of the present invention. Thus, particularly the prepared polyurethane is used for preparing transparent materials.

The composition of the present invention can further be used for preparing transparent molded articles. Therein the molded article is particularly formed by using the prepared polyurethanes. Further, the prepared transparent material can be used for preparing transparent molded articles.

Molded articles within the meaning of the present invention are particularly moldings as defined in DIN 7708, so to say designed plastic products which are prepared from molding masses or semi-finished materials. Therein molding masses refers to liquid, pasty or solid substances in processable state which can be formed to semi-finished materials or molded articles by non-cutting procedures. This is in contrast to a coating as is particularly defined in EN ISO 4618:2006 Therein a coating is defined to form a continuous layer formed by a single or repeated application of a coating material onto a substrate. Thus, a coating is particularly characterized by the presence of a corresponding substrate. In particular coatings are generally remarkably thinner than molded articles. Particularly preferred molded articles of the present invention are three dimensional one piece molded articles, the smallest dimension (thickness) being at least 1 mm, more preferably at least 2 mm, more preferably at least 3 mm. Preferably these molded articles exhibit such a dimension that their geometry can encompass a sphere with a diameter of at least 1 mm, preferably at least 2 mm, more preferably at least 3 mm.

The molded articles of the present invention are suitable for a variety of different applications of transparent materials, particularly as a glass substitute for preparing panes, for example sunroofs, front-, rear- or side-windows in the automotive or aircraft engineering, as safety glass or for transparent sealing of optical, electronic or optoelectronic devices, such as for example solar modules, LEDs or lenses or collimators as they are used for example as optical head in LED-lights or car headlights.

In addition the molded article of the present invention can be an optical lens. An optical lens is particularly an optically active element with two refractive surfaces. Particularly, an optically lens is understood to be a transparent molded article which allows imaging of objects in reduced or enlarged size using light refraction. Such lenses are particularly used in microscopes, telescopes, lenses, lights, projectors, magnifying glasses and spectacle lenses. In optical devices such lenses are usually combined to form a lens system.

It is particularly preferred to use the polyurethane of the present invention for preparing a transparent molded article which is an optical lens. Most preferred is the use of the polyurethane of the present invention for preparing an optical lens which is a spectacle glass.

The preparation of optical lenses, particularly spectacle lenses, is usually carried out by using common casting processes as used in the eyeglass industry. Therein it is preferred to use casting molds comprising two glass molds and a polymeric sealing ring, wherein the composition of the invention is cured. It is preferred to cure without pressure. More preferably a strict temperature control is used. Such temperature control is preferably carried out in the range of 10 to 150° C., preferably for a period of up to 60 hours, more preferably up to 48 hours. In a preferred embodiment curing is carried out solvent free.

In one aspect of the present invention a polyurethane is provided which is obtained by curing the composition of the present invention.

In another aspect of the present invention an optical lens is provided which is obtained by using the composition of the present invention.

In a further aspect of the present invention a spectacle lens is provided which is obtained by using the composition of the present invention.

Furthermore, a process for preparing transparent materials by curing the compositions of the present invention is provided. Therein the transparent materials may particularly be transparent molded articles. Such molded articles are preferably optical lenses, particularly spectacle lenses.

To ensure absence of bubbles and highest transparency of the transparent materials of the present invention the both components A) and B) are deaerated before being mixed, usually after addition of optionally used auxiliaries and additives C). This can be carried out for example for 10 minutes up to six hours at temperatures up to 80° C. under reduced pressure, for example at 5 to 50 mbar. Subsequently the composition is optionally again cooled to temperatures <50° C., preferably <30° C. and is preferably mixed and poured into glass molds on fine filters with a preferred average pore size of 0.1 to 10 µm. For controlled curing of the composition it is preferred to cool down the filled and closed glass molds. Then the temperature can be <20° C. Subsequently linear or stepwise heating up to a temperature of preferably >100° C., for example up to 130° C., is carried out for several hours.

After curing is completed and cooling to room temperature the thus obtained blanks are removed from the molds. To reduce stresses in the material they are usually post-annealed at temperatures of preferably >100° C., for example at 130° C. for several hours, for example for up to 10 hours. The development of the curing can for example be effected by IR-spectroscopic determination of the still present isocyanate groups.

In this way from the compositions according to the present invention highly transparent materials, in particular spectacle lens blanks, can be obtained. Such spectacle lens blanks can be further processed into finished spectacle lenses by current methods such as for example grinding, polishing, coloring, application of anti-reflective coatings, hard coatings and/or hydrophobic coatings by methods well known in the eyeglass industry.

Such method allows the preparation of spectacle lenses with yellowing resistance which have a refractive index of 1.50 and a very low optical dispersion, as the corresponding from PADC, being at the same time of lower weight due to the lower density and having remarkably improved mechanical and thermal resistance. Due to their high glass transition temperatures in the range of 100° C. and the high heat resistance of >80° C. they are particularly suitable for preparing rimless glasses. In contrast to PADC the new polyurethane glasses can be equipped with suitable UV stabilizers so that the ultraviolet waves which are harmful to the human eye can be completely filtered in the wavelength range <400 nm.

EXAMPLES

All percentages relate to the weight, unless stated otherwise.

According to the present invention the determination of the NCO contents is carried out by titration according to DIN EN ISO 11909.

NCO functionalities are calculated from the gel permeation chromatogram (GPC).

According to the present invention OH-numbers are determined by titration according to DIN 53240-2: 2007-11, according to the invention acid numbers are determined according to DIN 3682.

The residual monomer contents have been measured by gas chromatography with internal standard according to DIN EN ISO 10283.

All viscosity measurements have been carried out with a physical MCR 51 rheometer of the company Anton Paar Germany GmbH (DE) according to DIN EN ISO 3219 at the shown temperatures.

The glass transition temperature Tg has been measured using DSC (Differential Scanning calorimetrie) with a Mettler DCS 12E (Mettler Toledo GmbH, Giessen, Del.) at a heating rate of 10° C./min.

The determination of the heat resistance HDT has been carried out according to DIN EN ISO 75-2, procedure B, by using a bending stress of 0.45 MPa.

Shore hardness has been measured according to DIN 53505 by using a shore hardness tester Zwick 3100 (company Zwick, Del.).

Measurement of the refractive indices and Abbe-numbers has been carried out using an Abbe refractometer model B of company Zeiss.

Transmission measurements according to ASTM D 1003 have been carried out using a Haze-Gard Plus of the company Byk. The wavelength dependent transmission has been determined by using a dual beam spectrophotometer type Lambda 900 with integrated sphere (150 mm) of the company Perkin-Elmer, USA (0°/diffuse, reference: air T=100%).

Component A)
Polyisocyanate a1-I)

The preparation of a isocyanurate group containing HDI polyisocyanate was carried according to example 11 of EP-A 330 966 with the modification that 2-ethylhexanol was used as catalyst solvent instead of 2-ethyl-1,3-hexanediol.
NCO content: 22.9%
NCO functionality: 3.2
monomeric HDI: 0.1%
viscosity (23° C.) 1200 mPa·s Polyisocyanate a1-II)

The preparation of an isocyanurate- and iminoxadiazindion group containing HDI polyisocyanate was carried out according to example 4 of EP A 0 962 455, by trimerisation of HDI by using a 50% solution of tetrabutylphosphonium hydrogen difluorid in isopropanol/methanol (2:1) as catalyst. The reaction was stopped at an NCO content in the crude mixture of 43% by adding dibutylphosphate. Subsequently removal of the unreacted HDIs using thin film distillation at a temperature of 130° C. and a pressure of 0.2 mbar was carried out.
NCO functionality: 3.2
monomeric HDI: 0.2%
viscosity (23° C.) 700 mPa·s Polyisocyanate a2-I)

Isophorone diisocyanate (IPDI) was trimerized to an NCO-content of 30.1% according to example 2 of EP-A 0 003 765. The catalyst was deactivated by adding an equimolar amount of dibutylphosphate, relating to the used catalyst amount, and stirring for 30 minutes by 80° C. The separation of unreacted excess IPDI by thin film distillation was omitted. A solution of IPDI-isocyanurate polyisocyanate (35.5 wt-%) in monomeric IPDI (64.5 wt.-%) was present.
NCO-content: 30.5%
monomeric IPDI: 64.5%
viscosity (23° C.): 540 mPa·s Polyisocyanate a2-II)

18 g (1.0 mol) water were added continuously to a mixture of 1554 g (7 mol) IPDI and 0.5 g (0.002 mol) dibutylphosphate under nitrogen environment and stirring at a temperature of 80° C. for a period of 5 hours. A short time after the addition of water a steady $CO_2$-development occurred which was completed after stirring for 3 hours at 90° C. A colorless solution of IPDI-biuret polyisocyanate (38.4 wt.-%) in excess monomeric diisocyanate (61.6 wt.-%) was present.
monomeric IPDI: 61.6%
viscosity (23° C.) 2600 mPa·s Polyisocyanate a2-III)

The monomeric IPDI was separated from the afore mentioned polyisocyanate a2-I) by thin film distillation at a temperature of 170° C. and a pressure of 0.1 mbar. Solid IPDI-isocyanurate polyisocyanate with the following characteristic data was achieved:
NCO-content: 17.0%
monomeric IPDI: 0.3%
Tg: 65° C.

Mixtures of Components a-1) and a-2)

The HDI-polyisocyanate type a-1) was mixed together with a solution of a-2) (oligomeric IPDI mixed with monomeric IPDI) in a reaction vessel at room temperature (in case of polyisocyanate A-VII at 60° C.) under N2-atmosphere until a clear solution was present in each case.

The following table 1 shows compositions (parts by weight) and characteristic data of the so produced polyisocyanate.

TABLE 1

| | Compositions of component A) | | | | | | | |
|---|---|---|---|---|---|---|---|---|
| polyisocyanate | A-I | A-II | A-III | A-IV | A-V | A-VI | A-VII | A-VIII (comp.) |
| polyisocyanate a1-I) | 20 | 30 | 40 | 45 | — | 20 | 20 | 55 |
| polyisocyanate a1-II) | — | — | — | — | 30 | — | — | — |
| polyisocyanate | 80 | 70 | 60 | 55 | 70 | — | 46 | 45 |

TABLE 1-continued

| Compositions of component A) | | | | | | | | |
|---|---|---|---|---|---|---|---|---|
| polyisocyanate | A-I | A-II | A-III | A-IV | A-V | A-VI | A-VII | A-VIII (comp.) |
| a2-I) polyisocyanate | — | — | — | — | — | 80 | — | — |
| a2-II) polyisocyanate | — | — | — | — | — | — | 34 | — |
| a2-III) NCO-content [%] | 29.0 | 28.2 | 27.5 | 27.1 | 28.4 | 28.6 | 24.4 | 26.3 |
| viscosity (23° C.) [mPa · s] | 660 | 720 | 800 | 825 | 550 | 2200 | 41100 | 950 |
| viscosity (60° C.) [mPa · s] | n.n. | n.n. | n.n. | n.n. | n.n. | n.n. | 960 | n.n. |

Component B)—Polyester Polyoles
Polyester Polyol B1)

7.4 parts by weight neopentylglycol, 12.4 parts by weight 1,3-butanediol, 18.2 parts by weight 2,2,4-trimethyl-1,3-pentanediol, 16.2 parts by weight 2-butyl-2-ethyl-1,3-propanediol, 18.9 parts by weight 1,1,1-trimethylolpropane, 26.9 parts by weight adipic acid were weight in a flask and slowly heated to 200° C. with stirring at atmospheric pressure, whereby approximately 5 parts by weight water were distilled. After cleavage of the water vacuum (15 mbar) was slowly applied over a period of approximately 4 hours and the reaction was completed under these conditions within further approximately 15 hours. The polyester polyol thus obtained had the following characteristic data:
OH-number: 512 mg KOH/g
acid number: 1.8 mg KOH/g
viscosity (25° C.): 1900 mPa·s
OH-functionality: 2.36

Polyester Polyol B2)

A polyester polyol has been prepared according to the method described for B1) using 7.2 parts by weight neopentylglycol, 12.3 parts by weight 1,3-butanediol, 44.8 parts by weight 1,1,1-trimethylolpropane, 20.8 parts by weight succinic acid and 14.8 parts by weight ε-caprolacton and the following characteristic data have been obtained:
OH-number: 635 mg KOH/g
acid-number: 0.16 mg KOH/g
viscosity (25° C.): 2120 mPa·s
OH-functionality: 2.92
free ε-caprolacton: 0.04%

Polyester Polyol B3)

5.1 parts by weight neopentylglycol, 8.5 parts by weight 1,3-butanediol, 34.1 parts by weight 1,1,1-trimethylolpropane, 18.4 parts by weight succinic acid and 11.5 parts by weight ε-caprolacton were weight in a flask and slowly heated to 200° C. under atmospheric pressure while stirring, whereby approximately 5 parts by weight water were distilled. After cleavage of the water was completed, vacuum (15 mbar) was slowly applied over a period of approximately 4 hours thus completing the reaction under these conditions within a further period of approximately 15 hours. After cooling to room temperature additional 8.4 parts by weight neopentylglycol and 14.0 parts by weight 1,3-butanediol were admixed. the thus obtained polyester polyol had the following characteristic data:
OH-number: 659 mg KOH/g
acid-number: 1.30 mg KOH/g
viscosity (25° C.): 2410 mPa·s
OH-functionality: 2.53
free ε-caprolacton: 0.05%

Polyester Polyol B4)

A polyester polyol was prepared according to the method as described for B1) using 9.6 parts by weight neopentylglycol, 16.0 parts by weight 1,3-butanediol, 30.6 parts by weight glycerin, 30.1 parts by weight adipic acid and 13.7 parts by weight ε-caprolacton and the following characteristic data have been obtained:
OH-number: 663 mg KOH/g
acid number: 0.18 mg KOH/g
viscosity (25° C.): 1290 mPa·s
OH-functionality:
free ε-caprolacton: 0.06%

Polyester Polyol B5)

A polyester polyol was prepared according to the method as described for B2) using 10.3 parts by weight 1,3-butanediol, 6.3 parts by weight diethyleneglycol, 43.6 parts by weight 1,1,1-trimethylolpropane, 18.6 parts by weight succinic acid and 13.2 parts by weight ε-caprolacton and additional 4.9 parts by weight 1,3-butanediol and 3.0 parts by weight diethyleneglycol to achieve the following characteristic data:
OH-number: 658 mg KOH/g
acid number: 1.40 mg KOH/g
viscosity (25° C.): 2540 mPa·s
OH-functionality: 2.76
free ε-caprolacton: 0.05%

Preparation of Transparent Materials (Wherein Component B) is a Polyester Polyol)

Examples 1 to 8, Comparative Examples 1 and 2

For preparing transparent materials component A) and component B), which is a polyester polyol, were homogenized in the combinations and amount ratios (parts by weight) as shown in table 2, each according to an equivalent ratio of isocyanate groups to hydroxyl groups of 1:1, using a speed-mixer DAC 150 FVZ (company Hauschild, Del.) within 1 minute at 3500 U/min and subsequently poured by hand at room temperature into open non-heated polypropylene molds. Due to the high viscosity of the polyisocyanate component A-VII at room temperature this was heated to a temperature of 60° C. to facilitate the processability before weighing (all other polyisocyanate components were processed at room temperature). After a curing time of 8 hours at 130° C. in a drying cabinet the test plates (length×width×height: 200 mm×100 mm×4 mm) were demoled.

After a post-curing time of 24 hours at room temperature the test plates were tested with regard to their optical and mechanical properties. The results are shown in table 2, too.

TABLE 2 optical and mechanical properties of the prepared test plates
(component B) is polyester polyol)

| example | a-1):a-2) | 1 | 2 | 3 | 4 | 5 | 6 | 7 | 8 | comp. 1 | comp. 2 |
|---|---|---|---|---|---|---|---|---|---|---|---|
| polyisocyanate A-I | 20:80 | 57.0 | — | 63.0 | 63.1 | — | — | — | — | — | — |
| polyisocyanate A-II | 30:70 | — | 62.8 | — | — | — | — | — | — | — | — |
| polyisocyanate A-III | 40:60 | — | — | — | — | 64.2 | — | — | — | — | — |
| polyisocyanate A-V | 30:70 | — | — | — | — | — | 63.5 | — | — | — | — |
| polyisocyanate A-VI | 20:80 | — | — | — | — | — | — | 62.5 | — | — | — |
| polyisocyanate A-VII | 20:80 | — | — | — | — | — | — | — | 61.1 | — | — |
| polyisocyanate A-VIII | 55:45 | — | — | — | — | — | — | — | — | — | 59.3 |
| polyisocyanate a)-I) | 0:100 | — | — | — | — | — | — | — | — | 56.1 | — |
| polyester polyol B1) | | 43.0 | — | — | — | — | — | 37.5 | 38.9 | 43.9 | 40.7 |
| polyester polyol B2) | | — | 37.2 | — | — | — | — | — | — | — | — |
| polyester polyol B3) | | — | — | 37.0 | — | — | — | — | — | — | — |
| polyester polyol B4) | | — | — | — | 36.9 | 35.8 | — | — | — | — | — |
| polyester polyol B5) | | — | — | — | — | — | 36.5 | — | — | — | — |
| density [g/cm$^3$] | | 1.140 | 1.162 | 1.149 | 1.167 | 1.178 | 1.156 | 1.147 | 1.149 | 1.151 | 1.145 |
| shore hardness D | | 83 | 88 | 86 | 87 | 84 | 82 | 87 | 87 | 88 | 85 |
| Tg [° C.] | | 93 | 111 | 115 | 124 | 109 | 117 | 103 | 118 | 133 | 70 |
| HDT [° C.] | | 79 | 95 | 96 | 101 | 92 | 97 | 88 | n.n. | n.n. | n.n. |
| refractive index | | 1.5073 | 1.5080 | 1.5085 | 1.5015 | 1.5110 | 1.5110 | 1.5015 | 1.5092 | 1.5125 | 1.5105 |
| Abbe-number | | 54 | 56 | 46 | 56 | 51 | 56 | 52 | 54 | 56 | 51 |
| transmission [%] | | 93.2 | 93.4 | 93.2 | 93.0 | 93.9 | 92.6 | 93.2 | 93.3 | 93.0 | 93.0 |

As examples 1 to 8 show, the compositions according to the present invention provide hard, highly transparent plastics which have a high glass transition temperature and heat resistance. The test plates which have been prepared for comparison by using only component a-2) based on the IPDI (comp. 1) were extremely brittle and broke by deforming. Thus, the obtained material is less suitable for preparing spectacle lenses. The test plate which has been prepared for comparison by using an polyisocyanate component with a higher amount of HDI-polyisocyanate a-1) than claimed in the present invention (comp. 2) is not suitable as eye glass material due to the insufficient glass transition temperature and heat resistance.

The direct comparison of the product characteristics of the materials of examples 1 to 7 prepared according to the present invention with those of polyallyldiglycol carbonate, the standard material for preparing plastic spectacle glasses until today (table 3) shows the clear advantages of the new materials relating to mechanical and thermal stability in combination with the outstanding optical properties. Furthermore, the lower density of the polyurethane according to the present invention allows the preparation of glasses which are more than 10% lighter than those made of PADC.

TABLE 3 product characteristics of polyallyldiglycol carbonate

| | |
|---|---|
| density [g/cm$^3$] | 1.31 |
| Tg [° C.] | 85 |
| HDT [° C.] | 55-65 |
| refractive index | 1.498 |

TABLE 3-continued product characteristics of polyallyldiglycol carbonate

| | |
|---|---|
| Abbe-number | 59.3 |
| transmission [%] | 89-91 |

(Source: CR-39® product bulletin, company PPG Industries Inc., edition Apr. 20, 2006)

Preparation of an Eye Glass Blank

Polyisocyanate A-I was mixed with 1.0% Zelec® UN (acid phosphate ester release agents, Stepan Company, Northfield, Ill., USA) and 0.5% of Tinuvin® 326 (UV protector, BASF Schweiz AG, Basel) and stirred at 60° C. and 40 mbar for appr. 3 hours for degassing until the end of the visible foam formation. Polyester polyol B4) was degassed in the same manner.

After cooling to room temperature 63.4 parts by weight of the pretreated and additive treated polyisocyanate A-I were mixed in a stirring vessel with 36.6 parts by weight of the degassed and to 40° C. preheated polyester polyol B4), corresponding to an equivalent ratio of isocyanate groups to hydroxyl groups of 1:1, and the mixture was stirred for 30 minutes at 40° C. under vacuum (approximately 150 mbar). Subsequently the reaction mixture was conveyed via a valve equipped pipeline through a 0.5 μm PTFE-filter into a purified mold consisting of two glass molds and a polymeric sealing ring for spectacle glass blanks (diameter 75 mm, thickness 10 mm, −2 diopters) by applying a positive pressure of nitrogen to the stirring vessel. The casting mold was kept in an oven at 60° C. for 2 hours, then continuously heated up to 115° C. within 3 hours and finally kept at this temperature for further 2 hours. After cooling to room temperature the cured molded article was removed from the molds and for reducing stresses in the material post-annealed for 3 hours at 130° C.

In this way a totally clear, transparent eyeglass blank which was free of streaks was obtained and which exhibited the optical and mechanical properties as shown in example 4. The transmission at a wavelength of 390 nm was <1%, at 400 nm 2%, at 410 nm 45% and in the range above 450 nm 93%.

Component B)—Polyether Polyols
Polyether Polyol B1)
Polypropyleneoxid polyether with an OH-number of 550 mg KOH/g and a viscosity (23° C.) of 2000 mPa·s started on trimethylolpropane.
Polyether Polyol B2)
Polypropyleneoxid polyether with an OH-number of 525 mg KOH/g and a viscosity (23° C.) of 2600 mPa·s started on pentaerythrith.
Polyether Polyol B3)
Polypropyleneoxid polyester with an OH-number of 470 mg KOH/g and a viscosity (23° C.) of 5400 mPa·s started on ethylene diamine.

Preparation of Transparent Materials (Wherein Component B) is a Polyether Polyol)

Examples 9 to 15; Comparative Example 3

For preparing transparent materials component A) and component B), which is a polyether polyol, optionally by using DBTL as catalyst, were homogenized in the combinations and amount ratios (parts by weight) as shown in table 4, each corresponding to an equivalent ratio of isocyanate groups to hydroxyl groups of 1:1, using a speed mixer DAC 150 FVZ (Firma Hauschild, Del.) for 1 minute at 3500 rpm and subsequently poured by hand into open, non-heated polypropylene molds. After a curing time of 8 hours at 100° C. in a drying cabinet the test plates (length×width×height: 200 mm×100 mm×4 mm) were demolded.

After a pre-curing time of 24 hours at room temperature the test plates were tested with respect to their optical and mechanical properties. The test results are shown in table 4.

TABLE 4 optical and mechanical properties of the prepared test plates (component B) is polyether polyol

| example | a-1):a-2) | 9 | 10 | 11 | 12 | 13 | 14 | 15 | comp. 3 |
|---|---|---|---|---|---|---|---|---|---|
| polyisocyanate A-I | 20:80 | 58.7 | — | — | — | — | 57.5 | 54.9 | — |
| polyisocyanate A-III | 40:60 | — | 60.0 | — | — | — | — | — | — |
| polyisocyanate A-IV | 45:55 | — | — | 60.4 | — | — | — | — | — |
| polyisocyanate A-V | 30:70 | — | — | — | 59.2 | — | — | — | — |
| polyisocyanate A-VI | 20:80 | — | — | — | — | 57.9 | — | — | — |
| polyisocyanate a2-I) | 0:100 | — | — | — | — | — | — | — | 57.5 |
| polyether polyol B1) | | 41.3 | 40.0 | 39.6 | 40.8 | — | — | — | 42.5 |
| polyether polyol B2) | | — | — | — | — | 42.1 | 42.5 | — | — |
| polyether polyol B3) | | — | — | — | — | — | — | 45.1 | — |
| DBTL | | — | — | — | — | 0.1 | 0.1 | — | — |
| density [g/cm$^3$] | | 1.121 | 1.127 | 1.122 | 1.126 | 1.128 | 1.122 | 1.103 | 1.121 |
| shore-hardness D | | 87 | 85 | 86 | 86 | 85 | 88 | 86 | 84 |
| Tg [° C.] | | 103 | 98 | 93 | 98 | 92 | 116 | 97 | 119 |
| HDT [° C.] | | 89 | 83 | 82 | 82 | 79 | 92 | 83 | n.n. |
| refractive index | | 1.500 | 1.502 | 1.493 | 1.501 | 1.499 | 1.500 | 1.504 | 1.505 |
| Abbe-number | | 51 | 47 | 48 | 51 | 51 | 47 | 46 | 51 |
| transmission [%] | | 93.6 | 93.3 | 93.3 | 93.5 | 93.2 | 93.3 | 92.4 | 93.1 |

As examples 9 to 15 show, the compositions of the present invention provide hard, highly transparent materials with high glass transition temperatures and heat resistance. A test plate which has been prepared for comparison (comp. 3) by using only a component A) based on component a-2) based on IPDI was extremely brittle and broke during demolding. Accordingly, the prepared material is particularly less suitable as eyeglass material.

The direct comparison of the product characteristics of materials according to examples 9 to 15, prepared according to the present invention, with those of polyallyldiglycol carbonate, which is the standard material for preparing plastic eyeglasses until today (table 3) shows the clear advantages of the new materials regarding mechanical and thermal stability besides the outstanding optical properties. Furthermore the lower density of the polyurethanes according to the present invention allows the preparation of glasses which are more than 15% lighter than those from PADC.

Preparation of an Eyeglass Blank

Polyisocyanate A-I was mixed with 1.0% Zelec® UN (acid phosphate ester release agent, Stepan Company, Northfield, Ill., USA) and 0.5% Tinuvin® 326 (UV protector, BASF Schweiz AG, Basel) and stirred at 60° C. and 40 mbar for appr. 3 hours for degassing until the end of the visible foam formation. Polyether polyol B1) was degassed in the same manner.

After cooling to room temperature 59.3 parts by weight of the thus pretreated and additive treated polyisocyanate A-I were mixed in a stirring vessel with 40.7 parts by weight of the degassed and to 45° C. preheated polyether polyol B1), corresponding to an equivalent ratio of isocyanate groups to hydroxyl groups of 1:1, and the mixture was stirred for 30 minutes at 40° C. under vacuum (approximately 150 mbar). Subsequently the reaction mixture was conveyed via a valve equipped pipeline through a 0.5 μm PTFE-filter into a purified mold consisting of two glass molds and a polymeric sealing ring for spectacle glass blanks (diameter 75 mm, thickness 10 mm, −2 diopters) by applying a positive pressure of nitrogen to the stirring vessel. The casting mold was kept in an oven at 60° C. for 2 hours, then continuously heated up to 115° C. within 3 hours and finally kept at this temperature for further 2 hours. After cooling to room temperature the cured molded article was removed from the molds and for reducing stresses in the material post-annealed for 3 hours at 130° C.

In this way a totally clear, transparent eyeglass blank which was free of streaks was obtained and which exhibited the optical and mechanical properties as shown in example 8. A transmission at a wavelength of 390 nm was <1%, at 400 nm 2%, at 410 nm 48% and in the range above 450 nm 93%.

The invention claimed is:

1. A method for preparing an optical lens comprising providing a composition including component A) which comprises
   10 to 30 wt.-% of at least one oligomeric polyisocyanate a-1) based on hexamethylene diisocyanate, and 70 to 90 wt.-% of at least one polyisocyanate a-2) based on isophorone diisocyanate containing monomeric isophorone diisocyanate and at least one oligomeric polyisocyanate based on isophorone diisocyanate, wherein the %-data relate to the sum of components a-1) and a-2),
   at least one isocyanate-reactive component, selected from the group consisting of polyester polyol, polyether polyol and mixtures thereof,
   and one or more auxiliaries and/or additives, wherein the amount of isocyanate groups of component A) is in the range of 25 to 34 wt.-%, based on the total weight of component A).

2. The method according to claim 1, wherein the optical lens is a spectacle lens.

3. The method according to claim 1, wherein the isocyanate-reactive component is free of aromatic structures.

4. The method according to claim 1, wherein the isocyanate-reactive component comprises either polyester polyols or polyether polyols.

5. The method according to claim 1, wherein the at least one auxiliary and/or additive C) is selected from the group consisting of UV-stabilizers, catalysts, antioxidants, mold release agents, dyes, and mixtures thereof.

6. The method according to claim 1, wherein the oligomeric polyisocyanate of a-1) is obtained by reacting only hexamethylene diisocyanate as diisocyanate unit and the oligomeric polyisocyanate of a-2) is obtained by reacting only isophorone diisocyanate as diisocyanate unit.

7. The method according to claim 1, wherein the at least one polyisocyanate a-1) is present from 15 to 35 wt-%, and the at least one polyisocyanate a-2) is present from 85 to 65 wt-%.

8. The method according to claim 7, wherein the component A) has a viscosity of 550 to 2200 mPas at 23° C.

9. The method according to claim 1, wherein the amount of isocyanate groups of component A) is in a range from 26 to 30 wt-%.

10. The method according to claim 1, further comprising adding the composition at room temperature into a non-heated mold.

11. The method according to claim 1, wherein the optical lens has a glass transition temperature of from 93° C. to 117° C.

12. The method according to claim 1, wherein the optical lens has a refractive index of 1.5015 to 1.5092, and a transmission of 93% to 93.4%.

13. The method according to claim 12, wherein the optical lens has a shore hardness of 86 to 88.

* * * * *